(12) United States Patent
Ji et al.

(10) Patent No.: US 10,971,781 B2
(45) Date of Patent: Apr. 6, 2021

(54) SECONDARY BATTERY

(71) Applicant: LG Chem, Ltd., Seoul (KR)

(72) Inventors: Sang Gu Ji, Daejeon (KR); Cheon Hee Bok, Daejeon (KR); Myung An Lee, Daejeon (KR); Sang Uck Kim, Daejeon (KR); Geun Young Park, Daejeon (KR); Yong Han Kim, Daejeon (KR); Da Na Kim, Daejeon (KR)

(73) Assignee: LG Chem, Ltd.

( * ) Notice: Subject to any disclaimer, the term of this patent is extended or adjusted under 35 U.S.C. 154(b) by 117 days.

(21) Appl. No.: 16/338,227

(22) PCT Filed: Apr. 13, 2018

(86) PCT No.: PCT/KR2018/004365
§ 371 (c)(1),
(2) Date: Mar. 29, 2019

(87) PCT Pub. No.: WO2018/190690
PCT Pub. Date: Oct. 18, 2018

(65) Prior Publication Data
US 2020/0035968 A1 Jan. 30, 2020

(30) Foreign Application Priority Data
Apr. 13, 2017 (KR) .................. 10-2017-0047937

(51) Int. Cl.
*H01M 50/342* (2021.01)
*H01M 50/107* (2021.01)
(Continued)

(52) U.S. Cl.
CPC ..... *H01M 50/3425* (2021.01); *H01M 50/107* (2021.01); *H01M 50/116* (2021.01);
(Continued)

(58) Field of Classification Search
CPC .......... H01M 50/3425; H01M 50/342; H01M 50/30; H01M 50/578
See application file for complete search history.

(56) References Cited

U.S. PATENT DOCUMENTS 3,855,006 A * 12/1974 Kegelman ........... H01M 2/1282
429/82
2003/0077505 A1 4/2003 Goda et al.
(Continued)

FOREIGN PATENT DOCUMENTS

EP 2696387 A1 2/2014
JP H07211300 A 8/1995
(Continued)

OTHER PUBLICATIONS

Extended European Search Report including Written Opinion for Application No. EP18784168.9, dated Oct. 2, 2019, pp. 1-9.
(Continued)

*Primary Examiner* — Jeremiah R Smith
(74) *Attorney, Agent, or Firm* — Lerner, David, Littenberg, Krumholz & Mentlik, LLP

(57) ABSTRACT

A secondary battery is disclosed.
According to the present invention, in a case in which the secondary battery is ignited, a gas and materials within the secondary battery may be smoothly discharged to improve safety when the secondary battery is ignited.
In order to achieve the above-described object, according to an aspect of the present invention, a secondary battery includes: an electrode assembly; a battery can accommodating the electrode assembly; and a coating part applied to the battery can, wherein the battery can includes a slim part having a relatively thinner thickness than that of the other region of the battery can, and the coating part is applied to
(Continued)

US 10,971,781 B2

Page 2 the slim part and made of a metal material having tensile strength less than that of the slim part.

10 Claims, 2 Drawing Sheets

(51) Int. Cl.
*H01M 50/116* (2021.01)
*H01M 50/578* (2021.01)
*H01M 50/30* (2021.01)

(52) U.S. Cl.
CPC .......... *H01M 50/578* (2021.01); *H01M 50/30* (2021.01); *H01M 50/342* (2021.01); *H01M 2200/20* (2013.01)

(56) References Cited

U.S. PATENT DOCUMENTS

| | | | |
|---|---|---|---|
| 2010/0310927 A1* | 12/2010 | Imai | H01M 2/263 429/174 |
| 2012/0196163 A1* | 8/2012 | Shimizu | H01M 2/1241 429/57 |
| 2012/0219834 A1 | 8/2012 | Park | |
| 2013/0236752 A1 | 9/2013 | Yang et al. | |
| 2014/0045000 A1 | 2/2014 | Kim | |
| 2014/0072841 A1 | 3/2014 | Yamada et al. | |
| 2015/0280191 A1 | 10/2015 | Matsudo et al. | |
| 2016/0260552 A1 | 9/2016 | Sato et al. | |

FOREIGN PATENT DOCUMENTS

| | | |
|---|---|---|
| JP | H11213978 A | 8/1999 |
| JP | 2001143664 A | 5/2001 |
| JP | 2001307707 A | 11/2001 |
| JP | 2001345083 A | 12/2001 |
| JP | 2003346762 A | 12/2003 |
| JP | 3593709 B2 | 11/2004 |
| JP | 2012133904 A | 7/2012 |
| JP | 201436014 A | 2/2014 |
| JP | 2014103026 A | 6/2014 |
| JP | 2014232856 A | 12/2014 |
| JP | 2016167575 A | 9/2016 |
| KR | 20010008860 A | 2/2001 |
| KR | 20020080428 A | 10/2002 |
| KR | 20030084153 A | 11/2003 |
| KR | 20050018269 A | 2/2005 |
| KR | 20060027263 A | 3/2006 |
| KR | 20070067776 A | 6/2007 |
| KR | 20090060495 A | 6/2009 |
| KR | 20090105547 A | 10/2009 |
| KR | 20130063206 A | 6/2013 |
| KR | 101310735 B1 | 9/2013 |
| KR | 20130100713 A | 9/2013 |
| KR | 101696964 B1 | 1/2017 |
| KR | 20170004720 A | 1/2017 |
| WO | 2011145263 A1 | 11/2011 |
| WO | 2011158822 A1 | 12/2011 |
| WO | 2012153675 A1 | 11/2012 |
| WO | 2014073518 A1 | 5/2014 |

OTHER PUBLICATIONS

International Search Report for PCT/KR2018/004365, dated Nov. 14, 2018.

* cited by examiner

SECONDARY BATTERY

CROSS-REFERENCE TO RELATED APPLICATION

The present application is a national phase entry under 35 U.S.C. § 371 of International Patent Application No. PCT/KR2018/004365, filed on Apr. 13, 2018, published in Korean, which claims priority from Korean Patent Application No. 10-2017-0047937, filed on Apr. 13, 2017, the disclosures of which are hereby incorporated herein by reference.

TECHNICAL FIELD

The present invention relates to a secondary battery, and more particularly, to a secondary battery having a structure that is capable of effectively discharging a gas within the secondary battery.

BACKGROUND ART

In case of secondary batteries capable of being repeatedly chargeable and dischargeable, it is important to secure safety. To secure safety of such a secondary battery, according to the related art, a can-type secondary battery is provided with a safety vent that is disposed in an upper portion of the secondary battery and ruptured when a pressure within the secondary battery increases to discharge a gas within the secondary battery to the outside.

The reason for the increase in pressure within the secondary battery may vary. In the case of ignition of the secondary battery, which is one of the causes, there is a great risk of safety accidents and the like in that the pressure within the secondary battery sharply increases. Particularly, in the case in which the secondary battery is ignited, a discharge path for the gas, which is formed while the safety vent is ruptured may be blocked by an electrode and a separator, which are combusted in the secondary battery. In this case, there is a great risk of the safety accidents such as explosion and the like because the gas and materials within the secondary battery are not properly discharged.

DISCLOSURE OF THE INVENTION

Technical Problem

Therefore, an object of the present invention is to improve safety of a secondary battery by allowing a gas and materials within the secondary battery to be smoothly discharged when the secondary battery is ignited.

Technical Solution

In order to achieve the above-described object, according to an aspect of the present invention, a secondary battery includes: an electrode assembly; a battery can defining an outer wall accommodating the electrode assembly therein, the outer wall including a main body having a first thickness and a slim part having a second thickness thinner than the first thickness; and a coating part applied to the slim part and made of a metal material having a tensile strength less than a tensile strength of the slim part.

The battery can may include a beading part provided in an upper portion of the battery can and having a shape that is recessed inward, and the slim part and the coating part may be located below the beading part.

The coating part may have a third thickness, and a sum of the second thickness of the slim part and the third thickness of the coating part may be the same as the first thickness of the main body of the outer wall of the battery can.

The slim part may have a shape having at least two surfaces, and the at least two surfaces may extend in different directions and intersect each other.

The at least two surfaces may radially intersect each other.

A crossing portion of the slim part in which the at least two surfaces interest each other may have a fourth thickness less than the second thickness of a remaining portion of the slim part.

A ratio of the second thickness of the slim part to the first thickness of the main body of the outer wall of the battery can may be 0.6 to 0.7.

The second thickness of the slim part may be 0.09 mm to 0.11 mm, and first thickness of the main body of the outer wall of the battery can may be 0.14 mm to 0.16 mm.

The slim part and the coating part may each be disposed between the beading part and a central portion of the battery can.

The coating part may be made of an aluminum material.

A ratio of the tensile strength of the coating part to the tensile strength of the slim part may be 0.5 to 0.7.

Advantageous Effects

According to the present invention, in the case in which the secondary battery is ignited, the gas and materials within the secondary battery may be smoothly discharged to improve the safety when the secondary battery is ignited.

MODE FOR CARRYING OUT THE INVENTION

Hereinafter, a structure of a secondary battery according to the present invention will be described with reference to the accompanying drawings.

Figure 1:
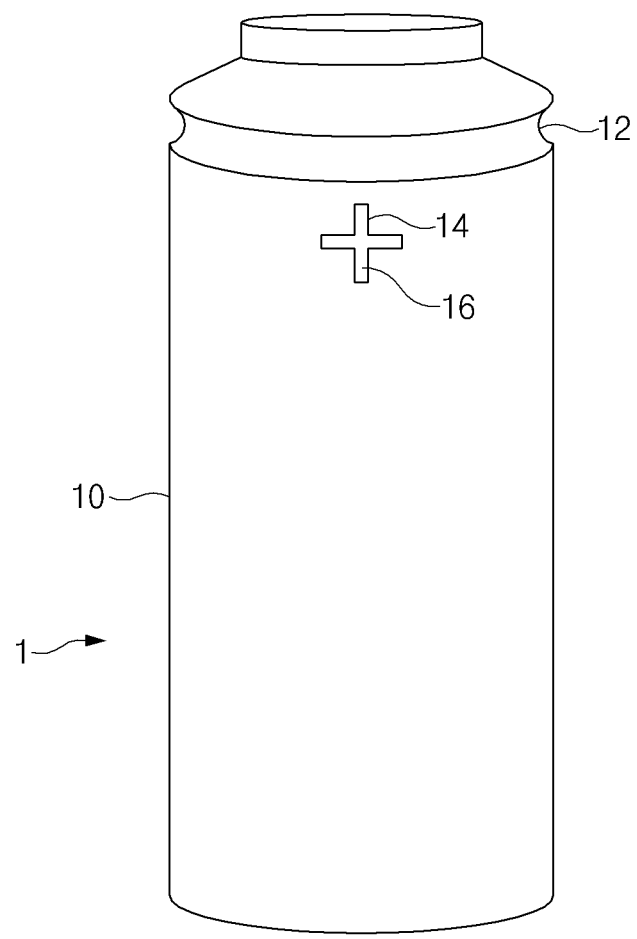
FIG. 1 is a side view illustrating a structure of a secondary battery according to an embodiment of the present invention.
Figure 2:
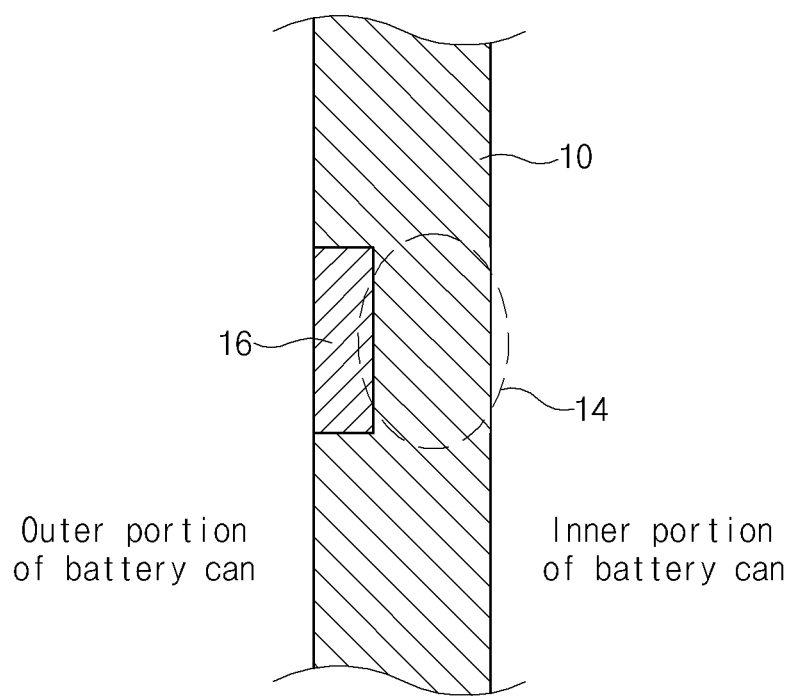
FIG. 2 is an enlarged side cross-sectional view of a region in which a slim part and a coating part are formed in the secondary battery according to an embodiment of the present invention.

FIG. 1 is a side view illustrating a structure of a secondary battery according to an embodiment of the present invention, and FIG. 2 is an enlarged side cross-sectional view of a region in which a slim part and a coating part are formed in the secondary battery according to an embodiment of the present invention.

A secondary battery according to the present invention may be a can-type secondary battery or a cylindrical secondary battery.

Referring to FIGS. 1 and 2, a secondary battery 1 according to an embodiment of the present invention may include a battery can 10 forming a main body of the secondary battery 1. An electrode assembly (not shown) including an electrode and a separator may be accommodated in the battery can 10.

A beading part 12 provided in an upper portion of the battery can 10 and having a shape that is recessed inward may be formed in the battery can 10 of the secondary battery 1.

Continuously referring to FIGS. 1 and 2, the battery can 10 of the secondary battery 1 according to an embodiment of the present invention may include a slim part 14 having a relatively thinner thickness than that of the other region of the battery case 10. Other region of the battery can 10 except for the slim part 14 may have a uniform thickness and also have a thickness thicker than that of the slim part 14.

As illustrated in FIGS. 1 and 2, the slim part 14 may have a shape that is recessed inward from an outer surface of the battery can 10 when viewed from the outside. However, alternatively, the slim part 14 may have a shape that is recessed outward from an inner surface of the battery can 10. That is, the slim part 14 of the secondary battery 1 according to another embodiment of the present invention may have a shape that is recessed to the inside of the battery can 10.

According to an embodiment of the present invention, since the battery can 10 of the secondary battery 1 includes the slim part 14 having the relatively thinner thickness than that of the other region. Thus, when a pressure within the secondary battery 1 abnormally increases due to ignition or explosion of the secondary battery, the slim part 14 having the relatively thin thickness may be ruptured first to quickly discharge a gas and materials within the secondary battery.

Particularly, according to the related art, the safety vent for discharging the gas within the secondary battery to the outside has been frequently provided for the safety of the secondary battery. However, when the secondary battery is ignited, a path for discharging the gas may be blocked by the electrode or the separator within the secondary battery during the combustion. Thus, the gas or materials may not be smoothly discharged. However, according to the present invention, since the slim part is formed in the side surface of the secondary battery, even though the secondary battery is ignited, the gas or materials within the secondary battery may be smoothly discharged.

Continuously referring to FIGS. 1 and 2, the slim part 14 according to an embodiment of the present invention has a shape of which at least two surfaces extending in different directions cross each other. FIG. 1 illustrates a case in which the slim part 14 has a cross shape in which two surfaces cross each other to form one crossing region. However, the embodiment of the present invention is not limited thereto. For example, the slim part 14 may have three or more surfaces crossing each other to form two or more crossing regions. Alternatively, the slim part 14 may have a shape in which two or more surfaces radially cross each other.

Also, the region in which at least two surfaces cross each other in the slim part 14 may have a thickness less than that of a region except for the region in which the at least two surfaces cross each other.

According to the present invention, the slim part 14 may have a shape in which at least two surfaces extending in different directions cross each other. Since the region in which the two or more surfaces cross each other has a thickness less than that of a region except for the region in which the two or more surfaces cross each other, when the rupture occurs in the region in which the two or more surfaces cross each other, the rupture may be expanded to the region in which the two or more surfaces do not cross each other, and thus, a more amount of gas may be quickly discharged. Also, since a large amount of gas within the secondary battery is discharged through the rupture part in various directions, the gas within the secondary battery may be effectively discharged.

The slim part may be disposed on a lower portion of the beading part 12. Particularly, as illustrated in FIG. 1, the slim part 14 may be disposed between the beading part 12 and the central portion of the battery can 10. In the case of the cylindrical battery, when the safety vent for discharging the gas in an emergency due to the increase in pressure within the secondary battery is generally provided on the upper portion of the secondary battery. Even though the safety vent is ruptured in the emergency due to the increase in pressure within the secondary battery, the region in which the rupture occurs may be blocked by foreign substances within the secondary battery. In this case, the risk of explosion of the secondary battery increases. According to the present invention, since the slim part 14 is disposed between the beading part 12 and the central portion of the battery can 10, i.e., in the upper portion of the secondary battery, if the safety vent provided in the upper portion of the secondary battery does not play a role, the gases filled in the upper portion of the secondary battery may be discharged through the ruptured slim part 14.

A ratio of a thickness of the slim part 14 to a thickness of the other adjacent region except for the slim part in the battery can 10 may be 0.6 to 0.7. Preferably, a ratio of a thickness of the slim part 14 to a thickness of the other adjacent region except for the slim part in the battery can 10 may be 0.65 to 0.68. When the slim part 14 has a thickness less than that of the other region, i.e., the ratio of the thickness of the slim part 14 to the thickness of the other region is less than 0.6, the rupture may occur in the slim part even though the pressure within the secondary battery is in a normal state. On the other hand, when the slim part 14 has a thickness greater than that of the other region adjacent to the slim part 14, i.e., the ratio of the thickness of the slim part 14 to the thickness of the other region exceeds 0.7, the rupture may not occur in the slim part even through the pressure within the secondary battery abnormally increases.

For example, the slim part 14 has a thickness ranging from 0.09 mm to 0.11 mm, and the other region adjacent to the slim part 14 in the secondary battery 10 may have a thickness ranging from 0.14 mm to 0.16 mm.

The secondary battery according to an embodiment of the present invention may further include a coating part 16 applied to the battery can 10. Here, the coating part 16 may be applied to the slim part 14 and have tensile strength less than that of the slim part 14. Also, the sum of the thickness of the slim part 14 and the thickness of the coating part 16 may be substantially the same as that of the other region of the battery can 10. Like the slim part 14, the coating part 16 may also be disposed below the beading part 12. For example, the coating part 16 may be disposed between the beading part 12 and the central portion of the battery can 10.

Also, as described above, the slim part 14 may be disposed on an outer portion of the battery can 10 or in an inner portion of the battery can 10. In addition, the coating part 16 may also be disposed on the outer portion of the battery can 10 or in the inner portion of the battery can 10.

According to the present invention, the coating part 16 may reinforce the region of the battery can 10, in which the slim part 14 is formed. That is, since the coating part is formed on the slim part, when the slim part is formed in the inner portion of the battery can, the coating part may protect the slim part against the electrode assembly or an electrolyte. When the slim part is formed on the outer portion of the battery can, the coating part may prevent the slim part from being damaged or corroding due to external foreign substances inserted into the slim part while protecting the slim part against external environments or external objects. However, even in this case, the coating part may have tensile strength less than that of the slim part so that the function of the slim part that is ruptured to discharge the gas to the outside is continuously maintained. However, if the coating part 16 is made of a material having tensile strength greater than that of the slim part 14, the occurrence of the rupture in the slim part may be interrupted. Thus, it may be preferable that the coating part is made of a material having tensile strength less than that of the slim part. Particularly, it may be preferable that the coating part is made of a metal material having tensile strength less than that of the slim part.

Here, the tensile strength of the coating part to the tensile strength of the slim part may be 0.5 to 0.7. More preferably, the tensile strength of the coating part to the tensile strength of the slim part may be 0.55 to 0.65.

When the coating part has too low tensile strength, the effect of the coating part that protects the secondary battery against the external impact may be deteriorated. On the other hand, when the slim part 14 has a too thick thickness, the rupture may not occur in the coating part even through the pressure within the secondary battery abnormally increases.

For example, the coating part 16 may have tensile strength of 150 Mpa to 200 Mpa. More preferably, the coating part 16 may have tensile strength of 170 Mpa to 180 Mpa.

The battery can of the secondary battery according to the present invention may be can made of nickel. The coating part 16 according to the present invention may be made of a material having tensile strength less than that of nickel.

The battery can 10 of the secondary battery according to the present invention may be made of a metal material, for example, nickel, steel use stainless (SUS), or an alloy thereof, preferably, may be made of SUS.

The coating part 16 of the secondary battery according to the present invention may be made of a metal material, for example, an aluminum material. For example, the coating part 16 may be made of an aluminum alloy. Here, the aluminum alloy used for the coating part 16 may contain aluminum at a weight ratio of 98% to 99% and manganese at a weight ratio of 1% to 2%. The aluminum alloy used for the coating part 16 may be Al 3003.

As described above, when the coating part 16 of the secondary battery is made of the metal material, the rupture of the slim part due to the increase in pressure within the secondary battery may be smoothly uniformly performed over the entire region of the slim part as compared with the case in which the coating part 16 is made of a resin material such as a fluorine resin or a poly-olefin resin.

The alloy generally has relatively higher thermal conductivity than that of the resin. Particularly, the aluminum alloy may have thermal conductivity that is remarkably higher than that of the resin. Here, when a temperature and pressure within the secondary battery increase due to the abnormal state within the secondary battery, the heat within the secondary battery may be transmitted to the coating part. As a result, the heat within the secondary battery may be uniformly transmitted to the entire region of the coating part to quickly cause the rupture. On the other hand, in the case of the resin material, since the thermal conductivity is lowered, when a sharp temperature change such as ignition occurs in the secondary battery, heat may be concentrated into a local region, and thus, the resin may be melted or thermally deformed. When the resin is melted or thermally deformed as described above, the rupture part may be blocked by the melted resin, or the rupture may be delayed.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery comprising:
   an electrode assembly;
   a battery can defining an outer wall accommodating the electrode assembly therein, the outer wall comprising a main body having a first thickness and a slim part having a second thickness thinner than the first thickness; and
   a coating part applied to the slim part and made of a metal material having a tensile strength less than a tensile strength of the slim part, wherein a ratio of the tensile strength of the coating part to the tensile strength of the slim part is 0.5 to 0.7.

2. The secondary battery of claim 1, wherein the battery can comprises a beading part provided in an upper portion of the battery can and having a shape that is recessed inward, and the slim part and the coating part are located below the beading part.

3. The secondary battery of claim 2, wherein the slim part and the coating part are each disposed between the beading part and a central portion of the battery can.

4. The secondary battery of claim 1, wherein the coating part has a third thickness, and a sum of the second thickness of the slim part and the third thickness of the coating part is the same as the first thickness of the main body of the outer wall of the battery can.

5. The secondary battery of claim 1, wherein the slim part has a shape having at least two surfaces, and the at least two surfaces extend in different directions and intersect each other.

6. The secondary battery of claim 5, wherein the at least two surfaces radially intersect each other.

7. The secondary battery of claim 5, wherein a crossing portion of the slim part in which the at least two surfaces intersect each other has a fourth thickness less than the second thickness of a remaining portion of the slim part.

8. The secondary battery of claim 1, wherein a ratio of the second thickness of the slim part to the first thickness of the main body of the outer wall of the battery can is 0.6 to 0.7.

9. The secondary battery of claim 1, wherein the second thickness of the slim part is 0.09 mm to 0.11 mm, and the first thickness of the main body of the outer wall of the battery can is 0.14 mm to 0.16 mm.

10. The secondary battery of claim 1, wherein the coating part is made of an aluminum material.

* * * * *